United States Patent [19]
Reidemeister et al.

[11] Patent Number: 5,542,296
[45] Date of Patent: Aug. 6, 1996

[54] COMPACT CAPACITIVE ACCELERATION SENSOR

[76] Inventors: Eric P. Reidemeister, 10 Alcott Cir., Taunton, Mass. 02780; Larry K. Johnson, 21 Brandon St., North Attleboro, Mass. 02760; Raymond E. Mandeville, 9 Jason's Grant Dr., Cumberland, R.I. 02864; Douglas B. Strott, 17 Collins St., Attleboro, Mass. 02703; Robert O. Southworth, 192 W. Forest Ave., Pawtucket, R.I. 02860

[21] Appl. No.: 367,655

[22] Filed: Jan. 3, 1995

[51] Int. Cl.⁶ .................................................. G01P 15/125
[52] U.S. Cl. ..................... 73/514.32; 73/514.36; 73/497; 361/280
[58] Field of Search .......................... 73/497, 493, 517 R, 73/514, 517 B, 526; 361/280, 283.3

[56] References Cited

U.S. PATENT DOCUMENTS

| | | |
|---|---|---|
| 4,875,135 | 10/1989 | Bishop et al. ............................. 73/718 |
| 5,239,871 | 8/1993 | Reidemeister et al. ............... 73/517 R |
| 5,303,589 | 4/1994 | Reidemeister et al. .................... 73/497 |
| 5,345,823 | 9/1994 | Reidemeister et al. ............... 73/517 R |

Primary Examiner—Hezron E. Williams
Assistant Examiner—Helen C. Kwok
Attorney, Agent, or Firm—Russell E. Baumann; Richard L. Donaldson; René E. Grossman

[57] ABSTRACT

An acceleration sensor (10, 10', 10") in which a metal blade member (24) having a source plate portion (24a), attachment portion (24p) and integral resilient beams (24b) extending between the source plate portion and the attachment portion is attached to a pin (22) received in turn in a bore (18a) of a substrate (18). The metal blade member (24) is mounted on the substrate (18) so that the source plate portion is a selected distance from a detect plate (18b) mounted on the substrate. The sensor is disposed in a cylindrical housing (12, 12', 12") which can be directly mounted to a circuit board (50) through terminal pins (18g, 18h, 18i) or can be provided with a threaded fastener (12"d). In one embodiment first and second sensor modules are received in a housing (42) to sense acceleration forces in two perpendicular directions. In another embodiment tab (30b) extending from a signal conditioning circuit (30) is placed between a connector body (20') and the sidewall (12b) of housing (12) with a detent (12c) formed in the sidewall (12b) to effect an electrical connection between circuit (30) and housing (12"). An O-ring gasket (13) is placed between the sidewall (12b) and the connector body (20') outboard of the detent to provide an environmental seal.

17 Claims, 6 Drawing Sheets

COMPACT CAPACITIVE ACCELERATION SENSOR

BACKGROUND OF THE INVENTION

This application relates generally to condition sensors and more particularly to sensors such as accelerometers having acceleration responsive means which are movable for providing an electrical signal in response to the existence of acceleration of a body being monitored.

In U.S. Pat. No. 5,345,823, assigned to the assignee of the instant invention, compact, rugged and inexpensive accelerometer devices are disclosed comprising a stiff, rigid, electrically insulating substrate having a recess in the form of a groove formed in one substrate surface. Electrically conductive film means are deposited on that surface to define a capacitor detect plate inside the recess, a capacitor source plate connector pad outside the recess and circuit paths which are connected to the detect plate and source plate connector and to respective terminal pads along an edge of the substrate surface. The accelerometer device includes a flat, electrically conductive plate or blade member of stiffly resilient metal which is formed with an attachment portion, a capacitor source plate portion and integral resilient beam means in a common plane. The attachment portion of the member is secured in electrically conductive relation to the source plate connector on the substrate with a thin layer of solder. Spacing between the upper surfaces of the detect plate and the source plate is determined by the depth of the recess. In one embodiment glass frit, including a bonding glass meltable at one temperature and glass rods of a small, precisely determined diameter which remain shape-retaining at the melting temperature of the bonding glass, is deposited over two spaced portions of the source connector to provide a precise level of attachment of the source plate to the source plate connector.

Although devices made in accordance with the teachings of the above referenced patent are very effective and perform well, the use of solder as a means of attachment involves a relatively time consuming reflow process and requires flux cleansing. In addition, there is a tendency for elements connected by solder to move slightly over time due to so-called creep thereby adversely affecting calibration of the device.

In U.S. Pat. No. 5,239,871, assigned to the assignee of the present invention, another accelerometer device is shown comprising an essentially flat electrically insulating substrate with a detect plate and a source plate connector disposed thereon and with a similar conductive blade member secured to the substrate in electrically conductive relation to the capacitor source plate connector. Spacing between the source plate portion and the detect plate is accomplished by using a shim between the attachment plate portion and source plate connector in one embodiment and in another embodiment by reducing the thickness of a portion of the metal plate. However, use of a shim adds an additional part and process step which adds to the cost of the device. Further, when using a shim it is difficult to obtain close dimensional control from one device to another. Use of a metal blade having a reduced thickness portion results in a more expensive blade member and one for which it is difficult to provide a properly balanced and mounted source plate portion.

In copending application Ser. No. 08/148,042, assigned to the assignee of the present invention, an accelerometer device is shown comprising a substrate having an electrically conductive detect plate on a top surface thereof and a bore between top and bottom surfaces of the substrate. An electrically conductive metal plate or blade having an attachment portion, a source plate portion and an integral beam means connecting the attachment portion to the source plate portion is fixedly attached, as by welding, to the end of an electrically conductive pin inserted in the bore with the source plate portion spaced a selected distance from the detect plate and with the pin in electrical engagement with a conductive path which extends from the top surface of the substrate into the bore. The axial position of the pin is adjusted to provide a selected capacitance level between the detect plate and the source plate portion.

Accelerometer devices made in accordance with the teachings of the copending application are compact and rugged while at the same time have lower thermal errors than prior art devices.

BRIEF SUMMARY OF THE INVENTION

It is an object of the present invention to provide condition-responsive devices such as accelerometers which are even more compact, lower in cost and more conducive to mass manufacturing techniques and which are particularly adapted for mounting in automotive applications. Another object is the provision of an acceleration sensor having a metal blade member which forms a movable plate of a capacitor, movable when subjected to acceleration forces along a selected axis, which blade member is sufficiently smaller than prior art blade members to permit a greater selection of packaging options while having sufficient movement for providing suitable electrical signals in response to such acceleration forces.

Briefly, in accordance with the invention, an acceleration sensor comprises a substrate having a capacitor detect plate mounted on a top surface with an electrically conductive blade member having an attachment portion, a source plate portion and integral resilient beam means extending between the attachment and source plate portions. The resilient beam means includes a pair of elongated beam members formed by a respective slot adjacent opposite sides of the blade member extending in the direction of a vertical axis essentially from end to end of the blade member. The beam members are connected at one end to the source plate portion which portion extends back in a direction toward the attachment portion. According to a feature of the invention the slots have portions which extend parallel to a horizontal axis along the other end of the blade member toward the center of the other end forming a pair of torsion arms connected to the beam members which improves the sensitivity of the blade member. According to yet another feature of the invention, the slots have a terminus closely spaced from one another to form a central pivot which further enhances the sensitivity of the blade member. The attachment portion is mounted on the substrate preferably by welding to a pin received in a bore formed through the substrate with the source plate portion overlying the detect plate in selected spaced relation. Circuit paths disposed on the substrate electrically connect the detect plate and the metal blade member to form a capacitor, the source plate portion being movable relative to the detect plate in response to an acceleration force acting along a Z-axis to provide an electric signal. Due to the increased sensitivity of the metal blade member, the blade member can be made sufficiently small so that it can be mounted in housings of a size and configuration used for other types of condition sensors, such as capacitor pressure transducers and, as a result, can be accommodated more easily in the small spaces available in many vehicular applications. According to a feature of the invention the blade members can be mounted on a cylindrical substrate which in turn is received in a cup-shaped housing to form a basic module which can be directly mounted to a circuit board or the like. The module can also include a connector body with a signal conditioning electric circuit received between the substrate and the connector body and can be directly mounted by means of a threaded member attached to the housing or it could be received on a mounting bracket which in turn can be fastened to a support to be monitored. In one embodiment first and second modules are received in a housing so that they sense acceleration forces acting along two axes extending in different directions. According to yet another feature of the invention an improved seal between the connector body and the housing containing a condition sensing device such as an accelerometer and associated electrical circuitry in which the housing is electrically connected to the circuitry is provided by placing the distal end portion of a tab on which a connecting electrical trace is disposed between the connector body and the housing with a seal placed outboard of the distal end and with the housing wall deformed into the tab to make an effective electrical connection. According to a feature of the invention over-travel protection of the source plate is provided by a separate shell received over the substrate and blade member in one embodiment and in another embodiment the substrate is inverted so that the bottom wall of the housing serves to limit blade member travel.

BRIEF DESCRIPTION OF THE DRAWINGS

Other objects, advantages and details of the novel and improved condition sensing device appear in the following detailed description of preferred embodiments of the invention, the detailed description referring to the drawings in which.

DESCRIPTION OF PREFERRED EMBODIMENTS

Figure 1:
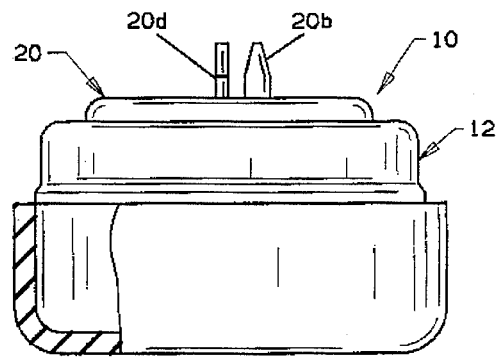
FIG. 1 is a front elevational view of a condition sensor module made in accordance with the invention, the module provided with a cushioning close ended sleeve member partly broken away.
Figure 2:
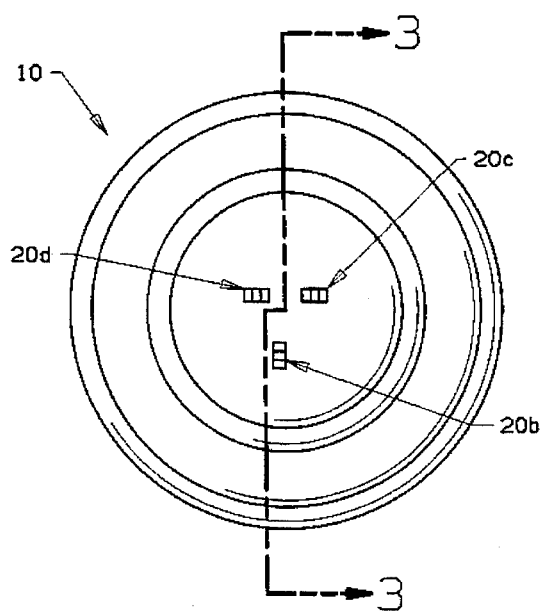
FIG. 2 is a top plan view of the FIG. 1 module.

Referring to the drawings, a condition-responsive sensor 10 made in accordance with a first embodiment of the invention and as shown in FIGS. 1–7 comprises a generally cylindrical cup-shaped housing 12 formed of suitable material having a bottom 12a and an upstanding wall 12b. Steel is particularly advantageous due to its magnetic shielding characteristics. A substrate 18 formed of suitable material such as electrically insulative aluminum oxide, $Al_2O_3$, is placed within housing 12 preferably on a gasket 14 of elastomeric material for a purpose to be described below. It will be understood that the substrate could be composed of various materials such as metal for example, having an electrically insulative top surface or other electrically insulating materials. Substrate 18 is preferably configured as a cylindrical disc conforming generally to housing 12 and has a bore 18a formed therethrough between opposite face surfaces. An electrically conductive detect plate 18b (FIG. 5) is provided on a top surface 18c of substrate 18. Plate 18b can be placed on the substrate in any suitable manner as by screen printing. Associated circuit paths 18d and 18e are also formed on surface 18c in a similar manner. Bore 18a is aligned with a source plate mounting portion 18f electrically connected to path 18d. A mounting element in the form of a pin 22, formed of material having a coefficient of thermal expansion closely matching that of substrate 18, is received in bore 18a. For example, when the substrate employed is composed of 94% alumina ceramic, pin 22 can be formed of alloy 42, an alloy having a nominal composition by weight of 42% nickel and the balance iron. Both alloy 42 and 94% alumina have closely matching expansion properties over an appropriate temperature range. Pin 22 is preferably formed with a curved end portion 22a on each end to serve as a weld projection. A recess (not shown) may be formed in the top surface of substrate 18 around bore 18a to enhance flow of coating material from trace 18f into the bore. Further details of a suitable pin mounting arrangement can be obtained from application Ser. No. 08/148,042, the subject matter which is incorporated herein by this reference.

Figure 4:
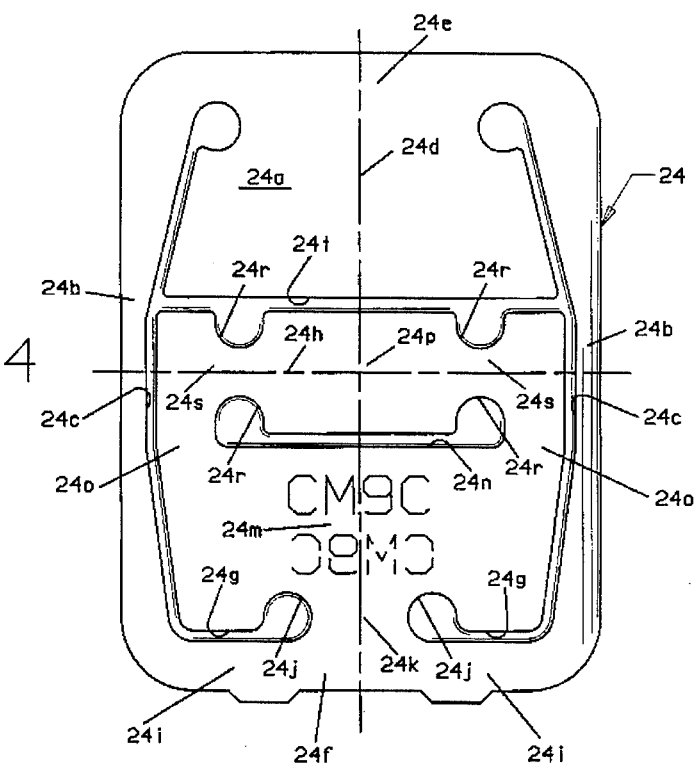
FIG. 4 is a top plan view of an acceleration condition sensing blade member used in the FIGS. 1–3 module.
Figure 5:
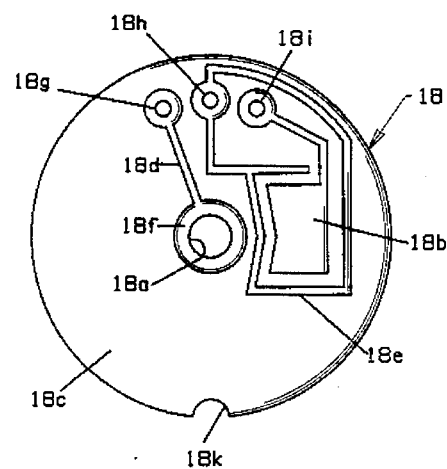
FIG. 5 is a top plan view of a substrate on which a capacitor detect plate is disposed along with associated electrical traces, the substrate used to mount the acceleration condition sensing blade member of FIG. 4.
Figure 6:
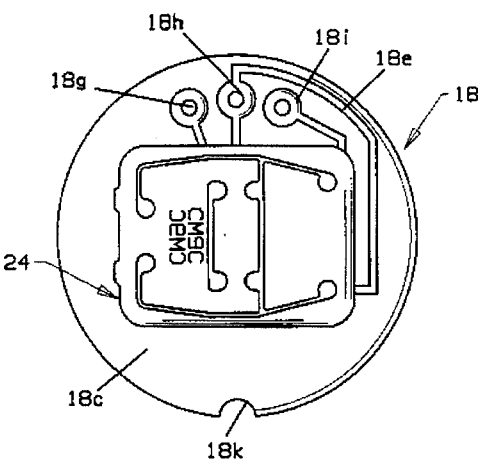
FIG. 6 is a view similar to FIG. 5 showing the acceleration condition sensing blade member mounted on the substrate.

An electrically conductive blade member 24, best seen in FIG. 4, is formed of material having a selected coefficient of thermal expansion relative to that of the substrate and pin to which it is to be mounted, e.g., in the structure described above, alloy 42 would be appropriate. Blade member 24 has a source plate portion 24a, preferably at the center of seismic mass, attached at each lateral side to a respective beam 24b defined by a slot 24c which extends adjacent to the sides essentially the full length of blade member 24, i.e., along a vertical axis 24d from a first end 24e to a second end 24f of the blade member. Each slot 24c has a portion 24g which extends generally parallel to the horizontal axis 24h along the second end of the blade member toward the center of the second end forming a pair or torsion arms 24i each connected to a respective elongated beam member 24b at the second end of the blade member. Slot portions 24g have a terminus 24j closed spaced from one another to form a central pivot 24k connecting torsion arms 24i to a central brace portion 24m. Central brace portion 24m is defined by slots 24c and 24g along with a centrally disposed horizontally extending slot 24n forming counter-flexing zones 24o which are connected to attachment portion 24p. Attachment portion 24p is separated from source plate portion 24a by a slot 24t which is in communication with respective slots 24c. Slots 24t and 24n have cutout portions 24r at opposite sides of attachment portions 24p to form pivots 24s coupling attachment portions 24p to counter-flex zones 24o. The attachment portion is preferably located at the center of mass to minimize torsional components resulting from forces applied along the horizontal and vertical directions which could adversely affect the connection of the blade member to the pin. Such forces could occur, for example, as a result of dropping the sensor prior to installation. The source plate portion 24a extends from beam members 24b in a direction back toward the attachment portion.

Although blade member 24 is similar to that disclosed in copending application Ser. No. 08/148,042, mentioned above, the provision of torsion arms 24i and central pivot 24k result in improved sensitivity or deflection of the blade member so that the blade member can be made significantly smaller both in the horizontal and vertical directions while still providing sufficient deflection of the source plate portion in response to acceleration forces along the z axis, i.e., an axis perpendicular to the horizontal and vertical directions. That is, the foot print of the blade member having a given material thickness can be significantly decreased in size and still provide sufficient deflection due to torsion arms 24i and central pivot 24k in spite of the fact that a significant portion of the deflection is provided by beams 24b extending essentially the full length of the blade and that deflection is proportional to length cubed. As a result, the blade member can be made sufficiently small to fit in a variety of packaging configurations and can be received in locations previously not suitable or not large enough for the larger prior art sensors, as will be discussed in greater detail below.

Figure 7:
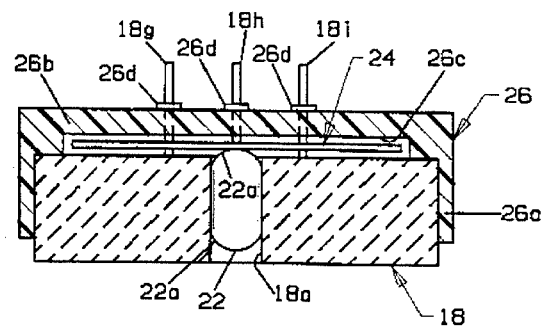
FIG. 7 is a cross sectional view of FIG. 6 with the addition of a blade member protecting shell received over the blade member and substrate.
Figure 7A:
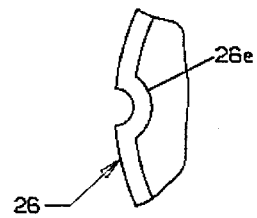
FIG. 7a is a top plan view of a portion of the FIG. 7 shell.

With particular reference to FIG. 7, a shell 26 formed of suitable material having a thermal coefficient of expansion close to that of substrate 18, such as a 30% glass filled, liquid crystal polymer when used with the alumina substrate noted above, is preferably received on substrate 18. Shell 26 is generally cylindrical having a sidewall 26a extending from end wall 26b. A recess 26c is formed in end wall 26b to provide space for metal blade member 24 with wall 26b serving to limit deflection of the blade member 24 to prevent overstressing due to abnormally high acceleration forces. Electrically conductive pins 18g, 18h and 18i, received in bores formed in substrate 18, extend through apertures formed in end wall 26b. Raised areas 26d are formed on the top surface of shell 26 around the bores receiving pins 18g, 18h and 18I to help avoid any coating material which may be placed on circuit components placed on top of shell 26 from flowing into the pin bores. Substrate 18 is preferably formed with an indexing notch 18k, see FIGS. 5 and 6, which cooperates with an indexing rib 26e formed on sidewall 26a of shell 26, see FIG. 7a, so that shell 26 will be properly aligned on substrate 18 thereby avoiding any stress from being placed on the conductive pins 18g, 18h and 18I due to misalignment. Preferably, wall 26a, which also serves to prevent entry of contaminants, extends from end wall 26b a distance which is slightly less than the thickness of substrate 18.

Figure 3:
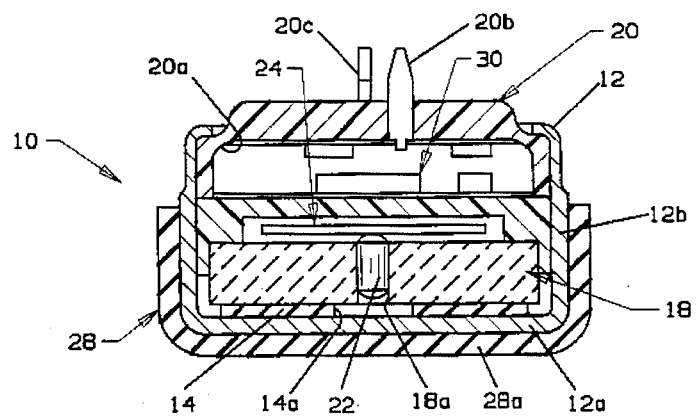
FIG. 3 is a cross sectional view of the FIG. 1 module.

The substrate and shell assembly of FIG. 7 is then received in housing 12, seen in FIG. 3, on resilient layer 14. Layer 14 is preferably provided with a central open area 14a to prevent the possibility of the material of layer 14 from extruding into bore 18a when the assembly is fastened to housing 12 described below. A connector body 20 having a cavity 20a adapted to receive signal conditioning circuit means 30, such as that shown in coassigned Pat. No. 4,875,135 to which reference may be had for further details, is received in housing 12 over shell 26. Connector body 20 mounts terminals 20b, 20c and 20d and may be fastened to housing 12 in any suitable manner, as by bending the outer distal end of wall 12b inwardly onto connector body 20 and against the bias provided by resilient layer 14.

Preferably, a closed end sleeve 28 of resilient material is placed about housing 12 so that if the sensor is subjected to a blow along an axis other than the z axis, e.g., is dropped, the sleeve will cushion the shock and avoid damaging the blade member and/or the mounting of the blade member.

Figure 8:
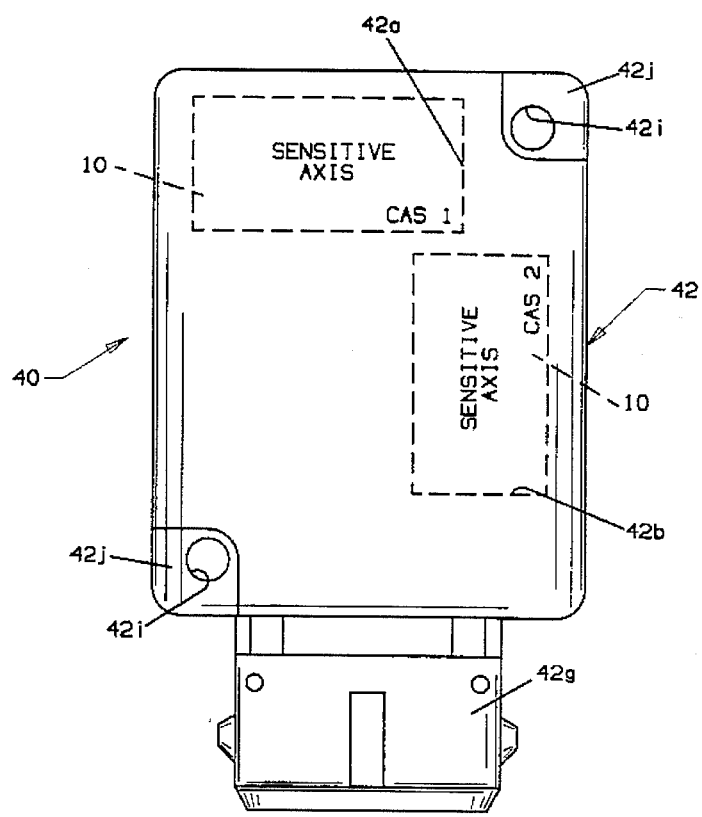
FIG. 8 is a top plan view of an acceleration condition sensor assembly which comprises first and second modules to detect acceleration forces along two axes extending in different directions.
Figure 9:
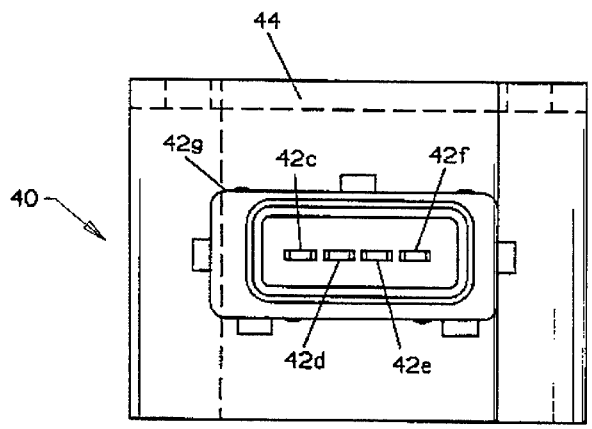
FIG. 9 is a right side view of FIG. 8.
Figure 10:
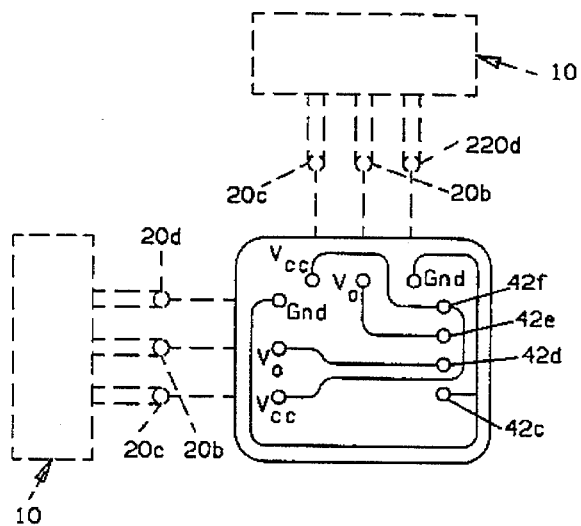
FIG. 10 is a schematic of the FIG. 8 assembly showing interconnection means between the terminals of the modules and the assembly terminals.
Figure 11:
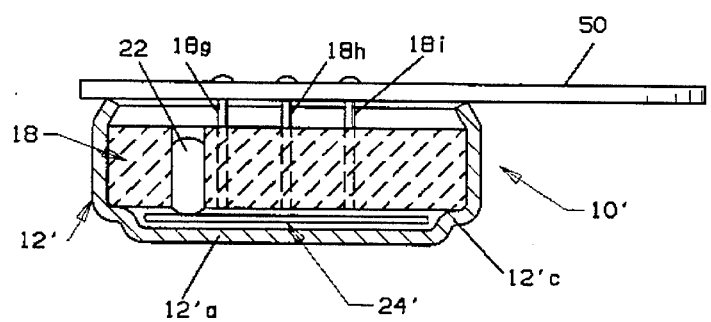
FIG. 11 is a cross sectional view of a modified acceleration condition sensor module mounted on a circuit board.

Sensor 10 can be separately mounted as by clipping it to a bracket or the like. Further, as shown in FIGS. 8–10 first and second sensor modules can be mounted in a housing 42 having sensor seating cavities 42a, 42b oriented at a selected angle with one another, e.g. 90° in which a respective sensor 10 can be placed to make a dual axis sensor assembly 40 so that acceleration forces can be sensed in two different directions. The terminals of each sensor module can be connected through a suitable harness or circuit board to terminals 42c–42f in connector 42g shown in FIG. 9. For example, the terminals of sensor module 10 comprising 20b, 20c, 20d are used for power $V_{cc}$, output $V_o$ and ground respectively. Terminals 20c ($V_{cc}$) and 20d (ground) of one sensor module 10 can be connected to respective terminals 20c and 20d of the second sensor module 10 to reduce the required number of terminals of dual sensor assembly 40. Preferably the sensors are potted into cavities 42a, 42b and, if desired, a lid 44 can be received over the cavities. Suitable mounting holes 42i in mounting bracket 42j can be used to mount sensor assembly 40 to a body whose acceleration is to be monitored using conventional fasteners. Although housing 42 is described having a dual sensor assembly 40, it is within the purview of the invention to incorporate three or more sensors oriented at selected angles so that acceleration forces can be sensed in various selected directions, if desired. FIG. 11 shows a modified sensor 10' which uses terminal pins 18g, 18h, 18i to directly, physically and electrically couple the sensor to a circuit board 50. Substrate 18 is inverted and received on an annular seat 12'c formed in tubular housing 12' with blade member 24', attached to pin 22, disposed between substrate 18 and bottom wall 12'a which serves to prevent over-travel of the blade member. In this embodiment, terminal pins 18g, 18h, 18i extend out the opposite face surface of substrate 18 for connection to circuit traces on circuit board 50. In this embodiment the signal conditioning circuit can be disposed on circuit board 50, if desired, rather than in the sensor 10' housing. It will be noted that blade member 24' is shown mounted in a non-central location, e.g., at central brace portion 24m, although mounting at attachment portion 24p is preferred.

Figure 12:
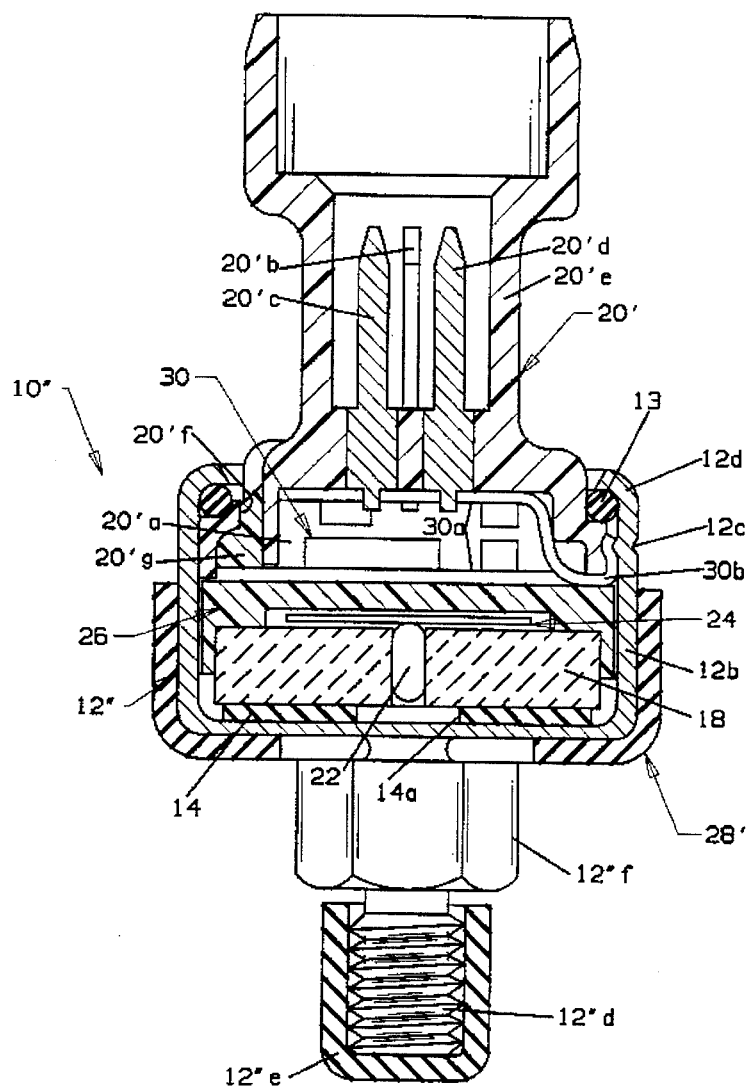
FIG. 12 is a cross sectional view of an acceleration condition sensor having a threaded mounting member and having an improved environmental seal.
Figure 13:
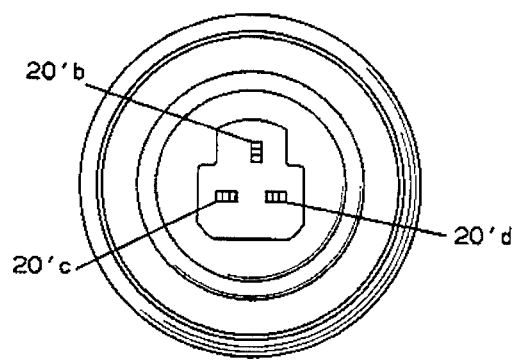
FIG. 13 is a top view of the FIG. 12 sensor.

As seen in FIG. 12, sensor 10" can be mounted by providing a threaded member 12"d either integrally attached to housing 12" or attached by welding or the like thereto. A close ended sleeve 12"e of resilient material such as rubber may be placed over threaded member 12"d prior to use both to protect the thread as well as to provide a cushion along with sleeve 28' in the event that sensor 10" is dropped on a hard surface. Sleeve 28', in addition to providing a protective cushion, also facilitates mounting of the sensor by providing frictional drive capability. That is, the sensor can be grasped through the sleeve and rotated without having to use the hexagonal mounting portion 12"f. Although housing 12" is shown as being formed of metal, it will be understood that the housing and threaded member could be formed from suitable material, e.g., polymeric material, if desired.

Figure 14:
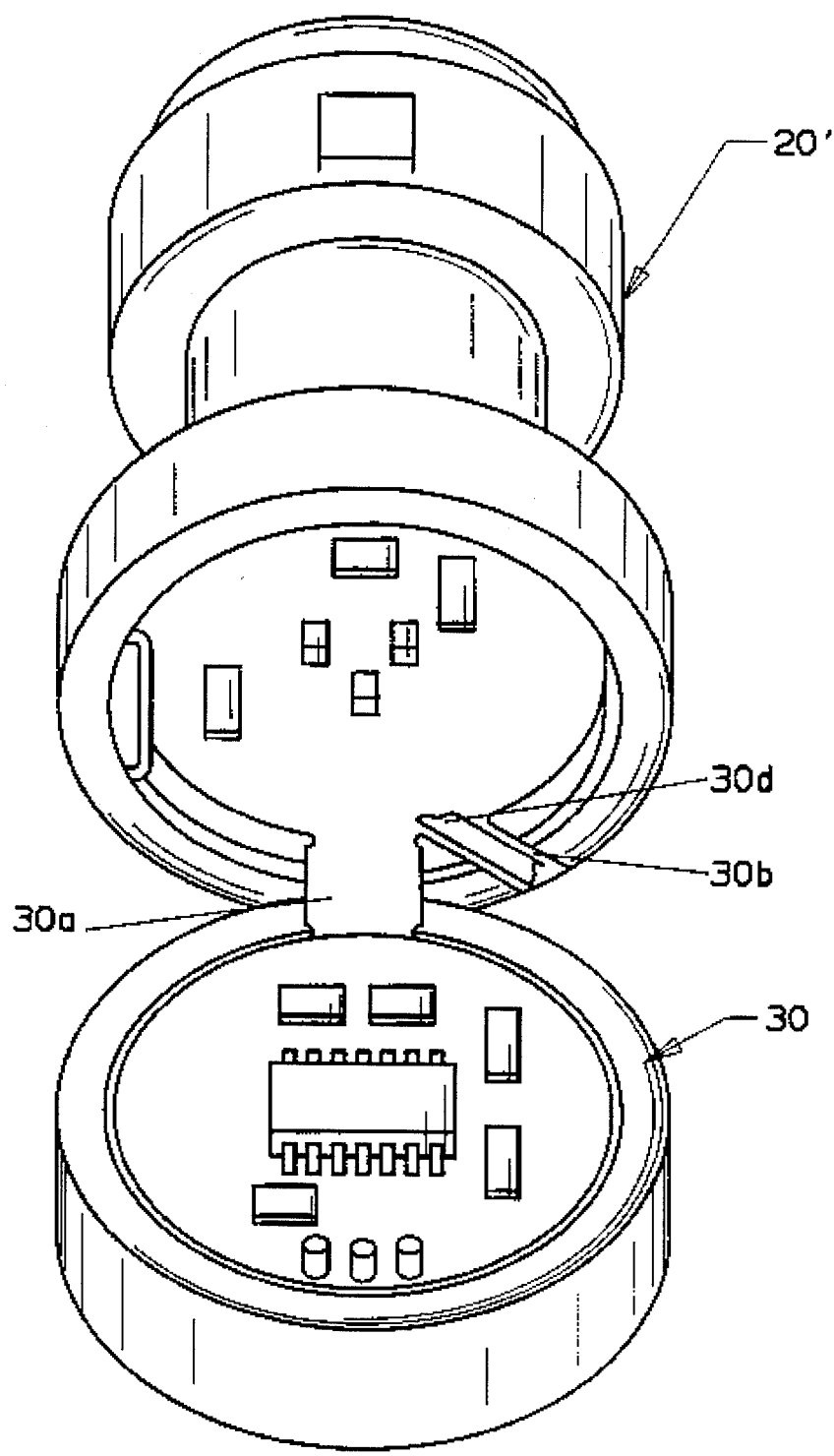
FIG. 14 is a perspective view of a portion of the FIG. 12 sensor with the electrical connector portion of the sensor partially separated from the substrate to show signal conditioning circuitry of FIG. 12.

Connector body 20' is shown with a shroud 20'e around terminals 20'b, 20'c, 20'd. Signal conditioning circuitry 30 received in cavity 20'a is shown comprising a flexible substrate 30a of polyimide or other suitable material on which circuit traces and components are disposed. A tab 30b extends from flexible substrate 30a on which a circuit trace 30d (FIG. 14) is disposed to provide a ground connection for circuit 30. Conventionally the tab on which the ground trace is disposed extends out of the circuit receiving cavity formed between connector body and the sensor sub-assembly between the connector body and metallic housing member with the distal free end of the housing wall deformed over against the tab and the connector body to make electrical connection between the circuit trace on the tab and the housing member. After deforming the wall of the housing member sealing material such as silicone typically is placed around the interface between the connector body and the housing wall to form an environmental seal in the manner described in U.S. Pat. No. 4,875,135 referenced above. However, effective placement of the sealing material is difficult and time consuming and serves as a potential leakage path allowing moisture to penetrate into the circuit cavity if the sealing material is not perfectly placed. As shown in FIG. 12, tab 30b is chosen to have a length only sufficient to extend to a point intermediate the outer distal end of wall 12b and the bottom of connector body 20'. A detent 12c is then formed in wall 12b in alignment with tab 30b and extending through the tab into connector body 20' to make an effective electrical connection between the ground trace on tab 30b and housing 12". A conventional flexible gasket such as O-ring seal member 13 is then placed around connector body 20' and the outer distal portion 12d of housing 12" is rolled over onto member 13 to form an effective environmental seal in an easily controlled assembly procedure. Calibration window 20'f can continue to be sealed using conventional epoxy material 20'g, such as silicone rubber, since the opening is sufficiently large that a dispenser can easily and accurately be inserted into it.

It should be understood that although particular embodiments of the invention has been described by way of illustrating the invention, the invention includes all modifications and equivalents thereof falling within the scope of the appended claims. For example, it is within the purview of the invention to employ the seal arrangement shown in FIG. 12 with various sensors having signal conditioning circuitry, such as capacitive pressure transducers.

What is claimed:

1. An acceleration condition responsive sensor comprising a substrate having a top surface, an electrically conductive detect plate mounted on the top surface of the substrate, an electrically conductive blade member having horizontal and vertical axes, first and second ends and opposite sides and having an attachment portion which is located generally at a center of mass of the blade member, an attachment means for attaching said blade means to said substrate, a source plate portion at said first end and integral resilient beam means for supporting and positioning said source plate portion extending between the attachment portion and the source plate portion, the resilient beam means including a pair of elongated beam members formed by a respective slot adjacent the opposite sides of the blade member and extending in the direction of the vertical axis essentially from the first end to the second end of the blade member, the beam members connected at the first end of the blade member to the source plate portion, the source plate portion extending back in a direction toward the attachment portion from the connection with the beam members, the respective slots having a portion extending parallel to the horizontal axis along the second end of the blade member toward the middle of the second end forming a pair of torsion arms connected to the respective elongated beam members at the second end of the blade member, the respective slots having a terminus closely spaced from one another to form a central pivot, the attachment portion being mounted on the substrate with the source plate portion overlying the detect plate in selected spaced relation, circuit paths disposed on the substrate electrically connected to the detect plate and the electrically conductive blade member to form a capacitor, the source plate portion being movable relative to the detect plate in response to an acceleration force to provide an electrical signal.

2. An acceleration condition responsive sensor according to claim 1 in which the blade member is generally rectangular in a top plan view and the substrate is generally cylindrical.

3. An acceleration condition responsive sensor according to claim 1 in which the substrate has a bore extending perpendicular to the top surface, the blade member is attached to a pin, the pin being received in the bore.

4. An acceleration condition responsive sensor according to claim 1 in which the substrate has a bore extending perpendicular to the top surface, the attachment means is a pin received in the bore, the attachment portion of the blade member is attached to the pin.

5. An acceleration condition responsive sensor according to claim 1 further including an over-travel stop spaced a selected distance from the top surface of the substrate to prevent over-travel motion of the blade member.

6. An acceleration condition responsive sensor according to claim 5 further including a cup-shaped housing having a bottom wall and a sidewall extending from the bottom wall to a distal end portion, a seating shelf formed on the sidewall, the substrate received in the housing with the top surface of the substrate disposed on the seating shelf, the bottom wall being spaced from the top surface a selected distance to serve as an over-travel stop to prevent over-travel motion of the blade member.

7. An acceleration condition responsive sensor according to claim 5 further including a cup-shaped housing having a bottom wall and a sidewall extending from the bottom wall to a distal end portion, the substrate received in the housing with the top surface of the substrate facing away from the bottom wall, a shell having a top wall and a sidewall extending from the top wall, the sidewall of the shell disposed on the top surface of the substrate with the top wall spaced from the top surface of the substrate a selected distance to serve as an over-travel stop to prevent over-travel motion of the blade member.

8. An acceleration condition responsive sensor according to claim 1 further including a metallic cup-shaped housing having a bottom wall and a sidewall extending from the bottom wall to a distal end portion, the substrate received in the housing with the top surface of the substrate facing away from the bottom wall, a connector body closing the cup-shaped housing and forming a circuit receiving cavity between the connector body and the substrate, a flex circuit substrate received in the cavity, the flex circuit substrate having a tab extending therefrom with a ground circuit trace thereon, the tab extending between the connector body and the sidewall of the housing to a point intermediate the bottom wall of the housing and the distal end portion of the sidewall, a detent formed in the sidewall through the tab and into the connector body to make an electrical connection between the ground circuit trace and the housing, a gasket member received between the connector body and the sidewall of the housing, the distal end portion of the sidewall turned over to capture the gasket member and form an environmental seal.

9. An acceleration condition responsive sensor according to claim 8 further including a layer of resilient material disposed between the substrate and the bottom wall of the housing.

10. An acceleration condition responsive sensor according to claim 1 further including a cup-shaped housing having a bottom wall and a sidewall extending from the bottom wall to a distal end portion, the substrate received in the housing, the substrate formed with a plurality of pin receiving bores, electrically conductive terminal pins received in each of the plurality of pin receiving bores in electrically conductive engagement with circuit paths on the substrate, and a circuit board with apertures, the electrically conductive terminal pins extending through the apertures in the circuit board and being attached to the circuit board to mount the sensor thereon.

11. An acceleration condition responsive sensor according to claim 1 further including a cup-shaped housing having a bottom wall and a sidewall extending from the bottom wall, the substrate received in the housing, and resilient material is disposed outside the housing on the housing side and bottom walls.

12. An acceleration condition responsive sensor according to claim 1 further including a cup-shaped housing having a bottom wall and a sidewall extending from the bottom wall, the substrate received in the housing and a threaded member extends downwardly from the bottom wall.

13. An acceleration condition responsive sensor according to claim 12 in which resilient material is disposed outside the housing on the sidewall.

14. An acceleration condition responsive sensor assembly comprising a support, first and second housing sensor seats having a seating surface disposed on the support, the housing seat surfaces being disposed at 90 degrees relative to one another, first and second acceleration sensor modules each comprising a generally cup-shaped housing having a bottom wall and a generally cylindrical sidewall extending upwardly therefrom forming a cavity, a cylindrical ceramic substrate disposed in the cavity, the substrate having opposed face surfaces with a detect plate on one face surface, the substrate having a bore extending between the opposed face surfaces, a pin received in the bore, a blade member having an attachment portion which is located generally at the center of the mass of the blade member, a source plate portion and integral resilient beam members extending between the attachment portion and the source plate portion, the attachment portion being fixed to an end of the pin with the source plate portion overlying the detect plate in selected spaced relation, circuit paths disposed on the substrate electrically connected to the detect plate and the blade member to form a capacitor, terminal pins mounted on the substrate extending from the circuit paths, the source plate portion being movable relative to the detect plate in response to an acceleration force acting generally perpendicular to the face surfaces to provide an electrical signal, the first and second sensor modules mounted in the respective first and second housing sensor seats with the bottom wall of the respective housing lying in a plane generally parallel with the respective first and second planes so that acceleration forces are sensed in two different directions.

15. An acceleration condition sensor assembly according to claim 14 in which the first and second planes are perpendicular to one another.

16. A condition responsive sensor comprising a ceramic substrate having means thereon responsive to a selected condition to provide an electrical signal, the substrate having sensor terminals extending therefrom, a polymeric connector body having connector terminals thereon, a metallic housing member having a cavity in which the substrate is disposed, the housing member having an upwardly extending wall having a distal end securing the connector body in overlying relation to the substrate forming a chamber between the connector body and the substrate, an electrical circuit disposed in the chamber electrically connected to the sensor terminals and the connector terminals for providing an electrical signal corresponding to the selected condition, the electrical circuit having an electrically conductive tab extending out of the chamber, the tab having a free distal end received between the connector body and the upwardly extending wall, a detent formed in the upwardly extending wall through the distal end of the tab and into the connector body to make electrical connection between the tab and the housing member and means for forming a seal between the connector body and the upwardly extending wall around the periphery of the connector body at a location between the distal end of the wall and the detent.

17. A condition responsive sensor according to claim 16 further including an acceleration responsive blade member.

* * * * *

UNITED STATES PATENT AND TRADEMARK OFFICE
CERTIFICATE OF CORRECTION

PATENT NO. : 5,542,296

DATED : August 6, 1996

INVENTOR(S): Eric P. Reidemeister et al.

It is certified that error appears in the above-identified patent and that said Letters Patent is hereby corrected as shown below:

On the title page, item [73] Assignee: "Texas Instruments Incorporated" should be listed as the assignee.

Signed and Sealed this

Fourth Day of November, 1997

*Attest:*

BRUCE LEHMAN

*Attesting Officer*     *Commissioner of Patents and Trademarks*